T. G. LEWIS.
VULCANIZER.
APPLICATION FILED AUG. 8, 1910.
988,361.
Patented Apr. 4, 1911.
2 SHEETS—SHEET 1.
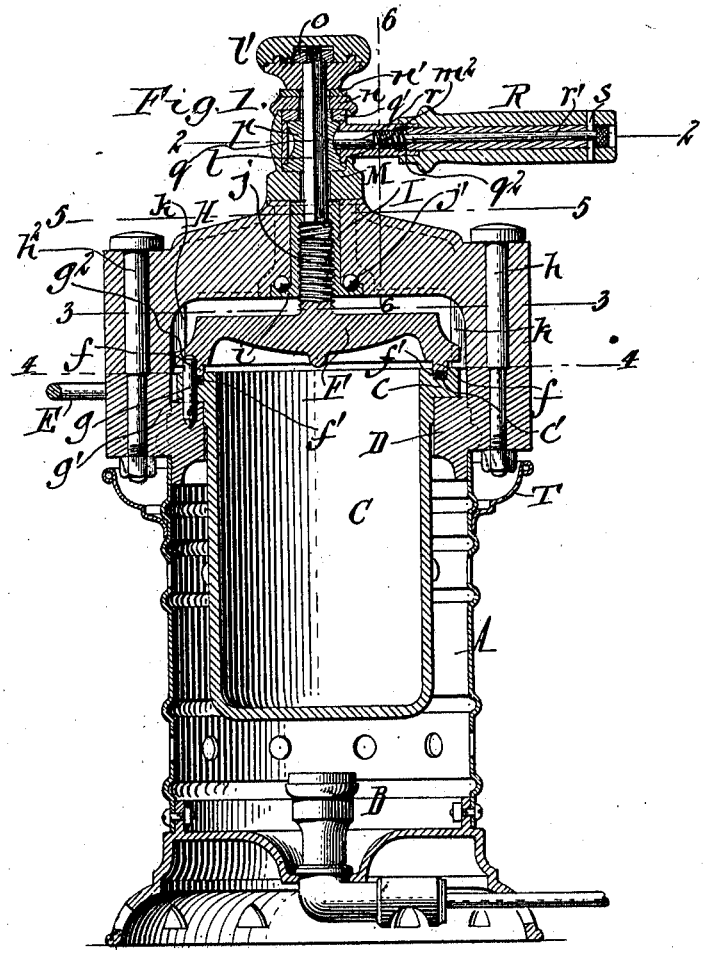
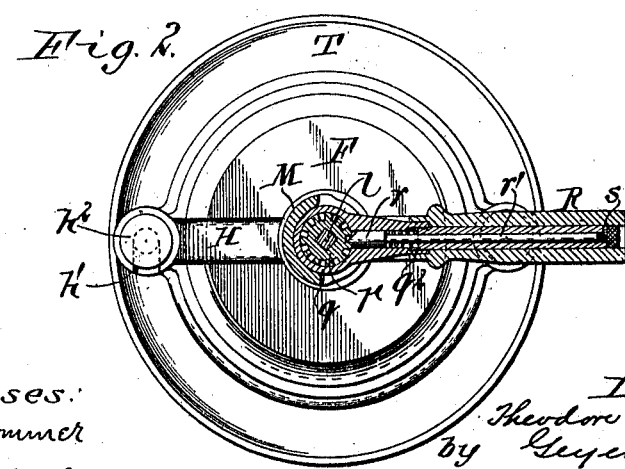
Witnesses:
Richard Sommer
Alfred Birkenhagen
Inventor
Theodore G. Lewis,
by Geyer & Poff
Attorneys.

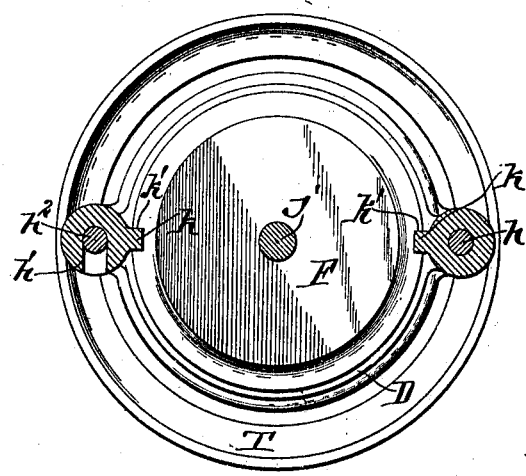
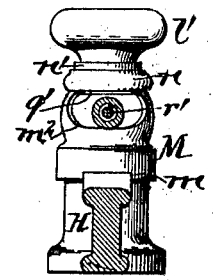
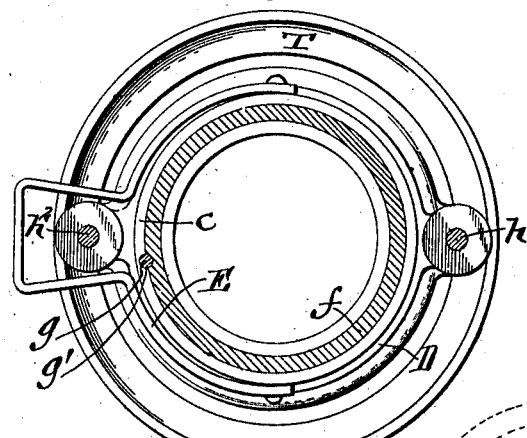
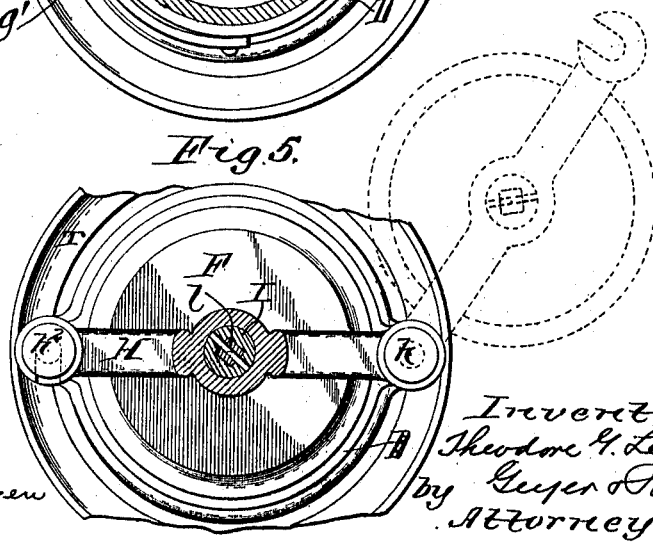

UNITED STATES PATENT OFFICE.

THEODORE G. LEWIS, OF BUFFALO, NEW YORK, ASSIGNOR TO THE BUFFALO DENTAL MANUFACTURING COMPANY, OF BUFFALO, NEW YORK, A CORPORATION OF NEW YORK.

VULCANIZER.

988,361.  Specification of Letters Patent. Patented Apr. 4, 1911.

Application filed August 8, 1910. Serial No. 576,128.

*To all whom it may concern:*

Be it known that I, THEODORE G. LEWIS, a citizen of the United States, residing at Buffalo, in the county of Erie and State of New York, have invented new and useful Improvements in Vulcanizers, of which the following is a specification.

This invention has more particular reference to dental vulcanizers in which the cap or cover of the pot is carried by a laterally-swinging yoke, so that the cover can be swung aside to afford ready access to the interior of the pot, without the necessity of handling the cover.

One object of my invention is the elimination of all loose parts for clamping and releasing the cover, such as wrenches, swing bolts or other parts liable to be lost or misplaced.

A further object is to simplify the construction of the cover-clamping mechanism and to so devise the same that it practically adjusts itself to the thickness of the usual packing between the cover and the pot, avoiding the necessity of providing separate means for this purpose.

A further object is the provision of simple means for preventing the pot from rising and following the cover when the latter is released and elevated.

The invention has the further object to improve the vulcanizer in other respects.

In the accompanying drawings consisting of two sheets: Figure 1 is a sectional elevation of a dental vulcanizer embodying the invention. Figs. 2, 3, 4 and 5 are horizontal sections on the correspondingly-numbered lines in Fig. 1. Fig. 6 is a vertical section on line 6—6, Fig. 1.

Similar letters of reference indicate corresponding parts throughout the several views.

A indicates the casing and B the customary gas burner.

C indicates the pot having at its top a projecting flange $c$ by which it is supported in a ring D secured to the top of the casing. Suitably pivoted to the flange of the pot is a bail E (Fig. 4) for facilitating the removal of the pot from the casing.

F indicates the cap or cover preferably provided on its underside with an annular rib $f$ which bears upon a packing gasket $f^1$ seated in a groove $c^1$ in the upper side of the pot-flange $c$. Projecting from the top of the ring D is a guide pin $g$ which passes through an opening $g^1$ in the pot-flange and into a socket $g^2$ in the cover-flange, as shown in Figs. 1 and 4. This pin insures the replacement of the pot in the ring and the cover upon the pot in the same relative positions.

H indicates the laterally-swinging yoke or cross bar which carries the pot-cover and which is pivoted at one end upon a fixed bolt $h$ rising from one side of the ring D, while the other end of the yoke is provided with a laterally-opening slot $h^1$ which engages with a similar bolt $h^2$ at the opposite side of the ring.

Rotatably seated in a cylindrical central opening of the yoke is a vertical nut or sleeve I the internal screw thread of which engages a screw-stem $j$ rising from the cover and preferably cast integral therewith. This nut while free to turn in the yoke is held against longitudinal movement therein. To reduce friction, a ball-bearing is preferably arranged between the nut and the yoke. In the preferred bearing shown in the drawings, the balls $j^1$ run in a race formed partly in a projecting flange $i$ at the lower end of the nut and partly in the upper side of an annular enlargement of the central yoke-opening which receives said flange.

The pot cover, while free to move up and down relatively to the yoke, is held against rotation by vertical ribs or feathers $k$ arranged on the inner sides of the yoke-bosses and engaging in notches $k^1$ formed in the opposing edges of the cover. These feathers bear upon or overhang the flange of the pot, as shown in Figs. 1 and 3, thus serving also as stops which prevent the pot from rising in the ring D and following the cover when the latter is released and raised, as hereinafter described.

Extending upwardly from the rotary sleeve I and rigidly secured thereto is a rod or shank $l$, preferably of angular cross section, which passes centrally through a hollow cylindrical head or block M seated upon the yoke H. This head is held against rotation by the yoke which interlocks with a transverse groove $m$ in the bottom of the head, as shown in Fig. 6, or by any other suitable means. To the projecting upper end of the shank $l$ is secured a knob $l^1$ for turning it and the attached sleeve I. The head M is closed by a cap $n$ between which and the knob $l^1$ a washer $n^1$ of vulcanized fiber or other non-conductive material may be interposed. In the construction shown, the knob is secured to the shank by a nut $o$.
The shank and nut thus secure the knob, head M, cap $n$, and washer $n^1$ in place.

Mounted upon the shank $l$ within the head M is a ratchet wheel $p$ and surrounding this wheel is an oscillating collar $q$ which is retained in place by a nut $q^1$ applied to the reduced upper end of the ratchet wheel. This collar has a comparatively long handle R for oscillating it which contains a sliding, spring-pressed pawl $r$ adapted to engage the notches of the ratchet wheel for rotating it. This pawl is rotatable in the handle, so that it can be reversed to turn the sleeve backward or forward. For this purpose, the handle R is free to slide lengthwise on the hollow tang $q^2$ of the collar $q$ and is attached to the rod $r^1$ of the pawl by a transverse pin $s$ or other suitable means, so that upon shifting the handle outward on the tang, the pawl is withdrawn from the ratchet wheel, permitting it to be reversed by turning the handle.

In the use of the vulcanizer, after swinging the yoke and the cover in position over the pot, the cover is lowered to its seat upon the pot by turning the knob $l^1$ in the proper direction. This operating device is comparatively quick in action, but does not afford sufficient leverage to secure a steam tight joint. This is accomplished by the use of the pawl and ratchet mechanism, above described, which by reason of its long operating handle enables the packing between the cover and the pot to be compressed with comparative ease. After the completion of the vulcanizing process, the cover is released by reversing the ratchet pawl and operating the handle to the right. This action may be continued by turning the knob $l^1$ until the pot cover clears the guide-pin $g$, when the yoke and the attached cover can be swung aside and the pot with its contents lifted out of the casing.

In practice, the cover carries the usual accessories, including a thermometer and gas regulator which parts are not shown in the drawings. To limit the oscillation of the ratchet-handle and prevent its striking and injuring such accessories, the head M is provided with a horizontal slot $m^2$ through which said handle passes and which is of the proper length for this purpose.

As shown, the casing is preferably provided at its upper end with an annular upwardly-flaring ring or flange T which serves to deflect the ascending heat away from the pot cover, avoiding interference with the thermometer mounted thereon.

I claim as my invention:

1. In a vulcanizer, the combination of a pot, a cover therefor having a screw, a yoke, a screw-sleeve engaging said screw and rotatably mounted in the yoke, a knob connected with said sleeve for turning it, and pawl-and-ratchet mechanism also connected with said sleeve.

2. In a vulcanizer, the combination of a pot, a cover therefor having a screw, a yoke, a screw-sleeve engaging said screw and rotatably mounted in the yoke, said sleeve having a shank extending above the yoke, a ratchet wheel mounted on said shank, an oscillating handle, and a pawl carried by said handle and engaging said ratchet wheel.

3. In a vulcanizer, the combination of a pot, a cover therefor having a screw, a yoke, a screw-sleeve journaled in the yoke and engaging said screw, a fixed hollow head mounted on the yoke and having a slot, said sleeve having a shank extending into said head, a ratchet wheel mounted on said shank within said head, an oscillating handle extending through said slot, and a pawl carried by the handle and engaging said ratchet wheel.

4. In a vulcanizer, the combination of a pot, a cover therefor having a screw, a yoke, a screw-sleeve journaled in the yoke and engaging said screw, a fixed hollow head mounted on the yoke and having a slot, said sleeve having a shank extending vertically through said head and provided above the latter with an operating knob, a ratchet wheel mounted on said shank within said head, and an oscillating handle extending through said slot and carrying a pawl which engages said ratchet wheel.

5. In a vulcanizer, the combination of a pot, a cover therefor having a screw, a yoke, a screw-sleeve journaled in the yoke and engaging said screw, a hollow head mounted on the yoke, said sleeve having a shank extending into said head, a ratchet wheel mounted on said shank within the head, an oscillating handle extending through the side of said head and having a collar journaled on said ratchet wheel, and a pawl carried by said handle and engaging the ratchet wheel.

6. In a vulcanizer, the combination of a pot, a cover therefor having a screw, a yoke, a screw-sleeve journaled in the yoke and engaging said screw, a hollow head mounted on the yoke and open at its top, a cap applied to the top of the head, said sleeve having a shank extending vertically through said head and cap, a retaining nut applied to the upper end of said shank, a ratchet wheel mounted on said shank within said head, and an oscillating handle projecting through the side of said head and carrying a pawl which engages said ratchet wheel.

7. In a vulcanizer, the combination of a pot-support, a guide-pin projecting upwardly therefrom, a pot having a flange resting on said support and provided with an opening which receives said pin, and a cover for the pot having a socket arranged to receive said pin.

8. In a vulcanizer, the combination of a support, a pot carried by said support, and a yoke extending across the pot and having a stop which overlaps the same.

9. In a vulcanizer, the combination of a support, a pot carried by said support, a yoke extending across the pot and having a stop which engages the top thereof, a cover for the pot carried by the yoke, and means for moving the cover vertically on the yoke.

10. In a vulcanizer, the combination of a support, a pot carried thereby, a cover for the pot having a screw, a yoke having a feather engaging the pot, a screw-sleeve journaled in the yoke and engaging said screw, and means for rotating said sleeve.

11. In a vulcanizer, the combination of a support, a pot carried thereby, a cover for the pot having a central screw stem, and a peripheral notch, a yoke having a feather engaging said notch and overlapping the top of the pot, a screw-sleeve journaled in the yoke and engaging said stem, and means for rotating the screw sleeve.

Witness my hand this 5th day of August, 1910.

THEODORE G. LEWIS.

Witnesses:
C. F. GEYER,
ANNA HEIGIS.

Copies of this patent may be obtained for five cents each, by addressing the "Commissioner of Patents, Washington, D. C."